(12) United States Patent
Ning et al.

(10) Patent No.: US 10,114,148 B2
(45) Date of Patent: Oct. 30, 2018

(54) HETEROGENEOUS LOG ANALYSIS

(71) Applicant: NEC Laboratories America, Inc., Princeton, NJ (US)

(72) Inventors: Xia Ning, Plainsboro, NJ (US); Guofei Jiang, Princeton, NJ (US); Haifeng Chen, Old Bridge, NJ (US); Kenji Yoshihira, Princeton Junction, NJ (US)

(73) Assignee: NEC Corporation (JP)

( * ) Notice: Subject to any disclaimer, the term of this patent is extended or adjusted under 35 U.S.C. 154(b) by 898 days.

(21) Appl. No.: 14/503,549

(22) Filed: Oct. 1, 2014

(65) Prior Publication Data

US 2015/0094959 A1    Apr. 2, 2015

Related U.S. Application Data

(60) Provisional application No. 61/885,894, filed on Oct. 2, 2013.

(51) Int. Cl.
*G01V 99/00*    (2009.01)

(52) U.S. Cl.
CPC .................... *G01V 99/005* (2013.01)

(58) Field of Classification Search
CPC ........ G01V 99/00; G01V 99/05; G01S 19/35; G06K 9/6218; G06K 9/6219
See application file for complete search history.

(56) References Cited

U.S. PATENT DOCUMENTS

| | | | |
|---|---|---|---|
| 5,659,662 A * | 8/1997 | Wilcox | G06K 9/6219 704/243 |
| 7,280,988 B2 | 10/2007 | Helsper et al. | |
| 7,451,210 B2 | 11/2008 | Gupta et al. | |
| 2006/0020924 A1 | 1/2006 | Lo et al. | |
| 2011/0131453 A1* | 6/2011 | Fernandess | G06F 11/079 714/37 |
| 2012/0173466 A1 | 7/2012 | Fernandess et al. | |
| 2013/0273937 A1* | 10/2013 | Nakahara | G01S 19/35 455/456.1 |
| 2014/0344622 A1* | 11/2014 | Huang | G06F 11/079 714/37 |

FOREIGN PATENT DOCUMENTS

EP    2360590    8/2011

OTHER PUBLICATIONS

Peng, W., et al. "Mining Logs Files for DataDriven System Management" SIGKDD Explorations. vol. 7, Issue 1. Jun. 2005. pp. 44-51.

(Continued)

*Primary Examiner* — Mohamed Charioui
(74) *Attorney, Agent, or Firm* — Joseph Kolodka (57) ABSTRACT

A method and system are provided for heterogeneous log analysis. The method includes performing hierarchical log clustering on heterogeneous logs to generate a log cluster hierarchy for the heterogeneous logs. The method further includes performing, by a log pattern recognizer device having a processor, log pattern recognition on the log cluster hierarchy to generate log pattern representations. The method also includes performing log field analysis on the log pattern representations to generate log field statistics. The method additionally includes performing log indexing on the log pattern representations to generate log indexes.

18 Claims, 7 Drawing Sheets

(56) References Cited

OTHER PUBLICATIONS

Sabato, S., et al. "Analyzing System Logs: A New View of What's Important" Proceedings of the 2nd USENIX workshop on Tackling computer systems problems with machine learning techniques. Apr. 2007. (7 Pages).
Sorkin, S. "Splunk Technical Paper: Large-Scale, Unstructured Data Retrieval and Analysis Using Splunk." Splunk Inc. 2011. (8 Pages).
Li, Tao et al., "An Integrated Data-Driven Framework for Computing System Management," IEEE Transactions on Systems, Man and Cybernetics, Part A: Systems and Humans, vol. 40, No. I, pp. 90-99, Jan. 2010. See pp. 91-93 and 98-99; and figure 8.
Carstoiu, Dorin et al., "A new Method for Clustering Heterogeneous Data: Clustering by Compression," WSEAS Transactions on Computers, vol. 8, No. 9, pp. 1461-1470, Sep. 2009. See pp. 1461 and 1465.

\* cited by examiner

HETEROGENEOUS LOG ANALYSIS

RELATED APPLICATION INFORMATION

This application claims priority to provisional application Ser. No. 61/885,894 filed on Oct. 2, 2013, incorporated herein by reference.

BACKGROUND

Technical Field

The present invention relates to data processing, and more particularly to heterogeneous log analysis.

Description of the Related Art

There exists some work on homogeneous log analysis, which are typically customized to one single specific application or service. In particular, domain knowledge about the application/service and in particular the log formats/semantics are completely available and the homogenous log analysis tools fully utilize such knowledge. The problem with such homogeneous log analysis tools is that once the system has updates, the homogeneous log analysis tools have to be manually updated. In addition, they significantly lack generalizability to other arbitrary systems and applications.

Some homogenous log analysis tools largely utilize mining algorithms to identify the most common/frequent log sequence patterns from logs data and they use such frequent patterns as a normal model for anomaly detection. Such methods typically suffer from scalability issues and they cannot be applied to arbitrarily large systems. In addition, the anomaly detection performance is dependent on the system parameters very sensitively, which makes the system configuration difficult.

Some homogeneous log analysis tools provide analysis over the system but with strong bias regarding the nature of the system behaviors (e.g., sequential ordering of certain events, causality relations among events, etc.). Typically, prior knowledge about the system is accessible and thus the analysis is designed based on/to conform to such knowledge. Such systems also have limitations on their applicability to other systems of different or unknown natures.

SUMMARY

These and other drawbacks and disadvantages of the prior art are addressed by the present principles, which are directed to heterogeneous log analysis.

According to an aspect of the present principles, there is provided a method for heterogeneous log analysis. The method includes performing hierarchical log clustering on heterogeneous logs to generate a log cluster hierarchy for the heterogeneous logs. The method further includes performing, by a log pattern recognizer device having a processor, log pattern recognition on the log cluster hierarchy to generate log pattern representations. The method also includes performing log field analysis on the log pattern representations to generate log field statistics. The method additionally includes performing log indexing on the log pattern representations to generate log indexes.

According to another aspect of the present principles, there is provided a system for heterogeneous log analysis. The system includes a hierarchical log clusterer for performing hierarchical log clustering on heterogeneous logs to generate a log cluster hierarchy for the heterogeneous logs. The system further includes a log pattern recognizes device having a processor for performing log pattern recognition on the log cluster hierarchy to generate log pattern representa-tions. The system also includes a log field analyzer for performing log field analysis on the log pattern representations to generate log field statistics. The system additionally includes a log indexer for performing log indexing on the log pattern representations to generate log indexes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to heterogeneous log analysis.

The present principles aim to solve the problem of recognizing, organizing, indexing and utilizing huge amount of heterogeneous log information from various system components/applications so as to help perform effective and efficient system monitoring and diagnosis. System monitoring and diagnosing present significant difficulties given the fact that the systems become prohibitively large and complex, the components of the systems exhibit complicated and unrevealed interactions, and the behaviors of the systems are determined by various heterogeneous/latent reasons, and thus the reasoning of a system's anomalous behaviors in a timely manner is tremendously hard. On the other hand, system monitoring/logging data provides a rich and semantic context of system events and behaviors, and therefore they represent a valuable source of information for in-depth understanding and diagnosing of the system of interest.

Therefore, the demand for an effective and efficient system for heterogeneous log organization and analysis is in extreme demand. However, very unfortunately, the development of heterogeneous (i.e., with different formats, different purposes and different content) log analysis methods and systems is far behind this demand due to the fact that heterogeneous log data are cumulated over periods into an extremely huge amount (as so-called big data) that is difficult to handle using conventional approaches, and additionally domain knowledge is seldom known for the log formats/semantics from a system with both many well-known/standard services/applications and also many other specific applications.

The present principles solve the following sub-problems in order to construct an automatics multi-function heterogeneous log analysis system in a principled way: (1) heterogeneous log categorization and indexing; (2) heterogeneous log format recognition; (3) online system summarization; and (4) information retrieval and knowledge extraction from heterogeneous logs.

The present principles solve the aforementioned problems by developing and applying the most advanced machine learning and data mining techniques. Specifically, the problems are solved, respectively, as follows:

1. Novel clustering framework is developed so as to categorize heterogeneous logs into coherent group structures (i.e., clusters) that conform respectively to the heterogeneous and unknown log formats. The clustering framework allows the heterogeneous log categorization to be easily performed on a modern big-data processing platform such as Hadoop. It also provides the mechanisms to allow various clustering methods to be plugged in the framework.

2. Once the heterogeneous logs are categorized, a novel hierarchical-tree-based organization method is developed, which enables log format recognition, log indexing and queries. Heterogeneous log format recognition is conducted by doing context-free motif finding within log clusters, and saving the results therefrom in the hierarchical organization. Thus, heterogeneous logs are indexed by their corresponding formats and locations in the organization hierarchy.

3. Queries are supported by the hierarchy via efficient search space pruning. Meanwhile, once there are hits with respect to the query, an analysis about the hits is conducted so as to report more analytical results on the query results, in addition to the query results.

Figure 1:
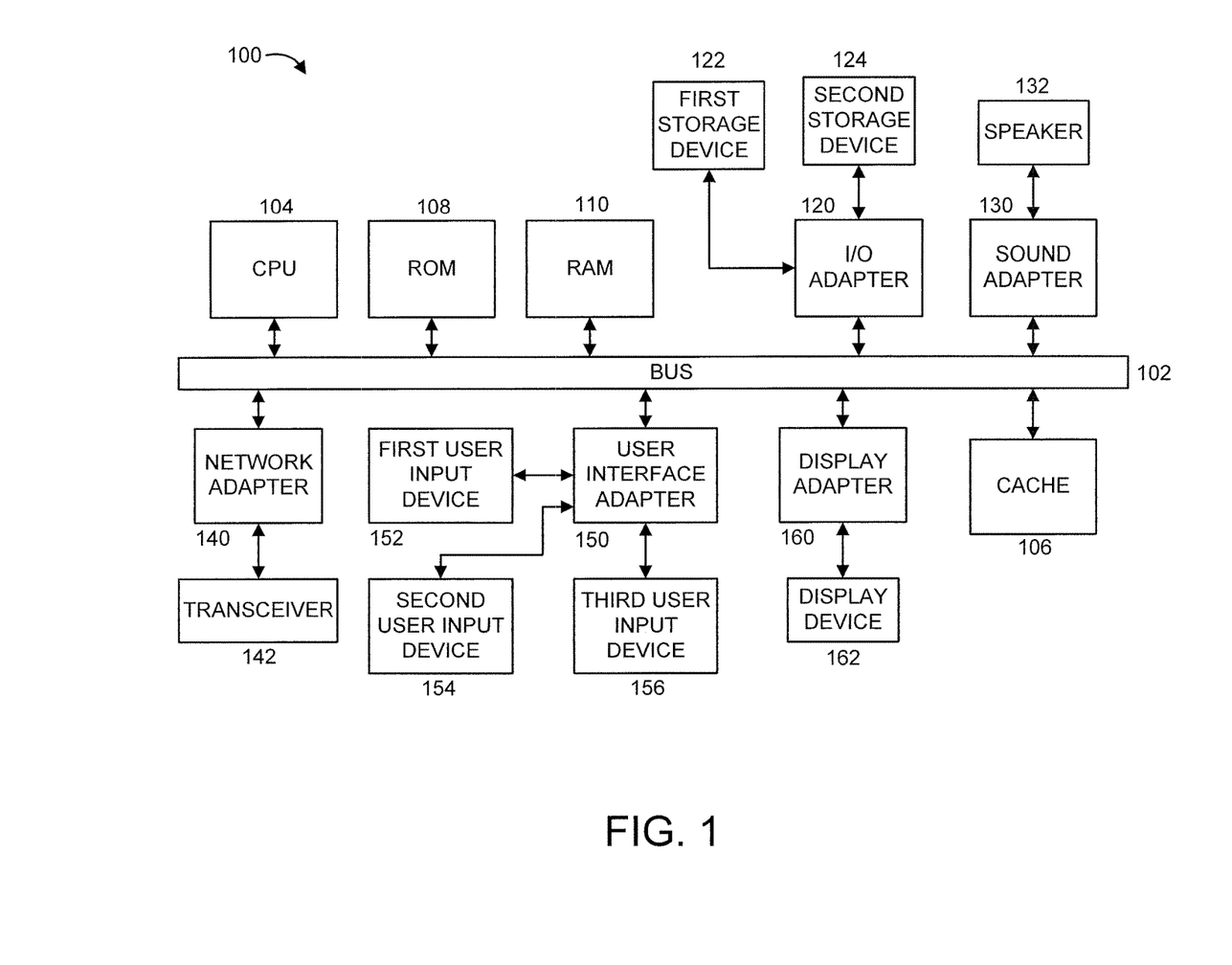
FIG. 1 is a block diagram showing an exemplary processing system 100 to which the present principles may be applied, according to an embodiment of the present principles.

FIG. 1 shows an exemplary processing system 100 to which the present principles may be applied, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
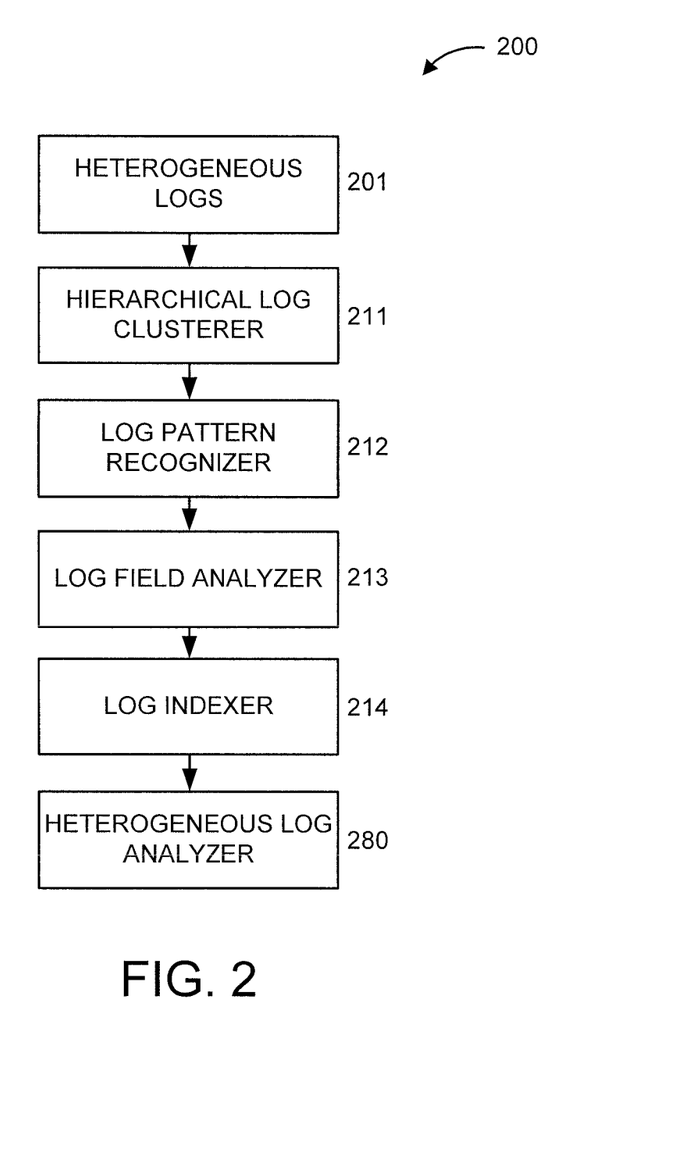
FIG. 2 is a block diagram showing an exemplary system 200 for heterogeneous log analyzing, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Further, it is to be appreciated that processing system 100 may perform at least part of the methods described herein including, for example, at least part of methods 300-700 of FIGS. 3-7, respectively. Similarly, part or all of system 200 may be used to perform at least part of methods 300-700 of FIGS. 3-7, respectively.

FIG. 2 shows an exemplary system 200 for heterogeneous log analyzing, in accordance with an embodiment of the present principles. The system 200 takes heterogeneous logs 201 from arbitrary/unknown systems or applications and performs automatic log analysis. The system 200 includes the following: a hierarchical log clusterer 211; a log pattern recognizer 212, a log field analyzer 213; a log indexer 214; and a heterogeneous log analyzer 280. While the elements of system 200 are shown in FIG. 2 in a sequentially connected configuration, it is to be appreciated that other connection configurations can also be used, while maintaining the spirit of the present principles. For example, a bus or other connection device can be used. These and other variations of FIG. 2 are readily determined by one of ordinary skill in the art given the teachings of the present principles provided herein, while maintaining the spirit of the present principles.

The hierarchical log clusterer 211 organizes the heterogeneous logs into a hierarchy structure of clusters. The log pattern recognizer 212 recognizes log patterns based on the cluster structures. The log field analyzer 213 analyzes logs fields based on log patterns and then the logs are represented in a statistically meaningful way. The log indexer 214 indexes the logs based on their cluster structures and field content.

Figure 3:
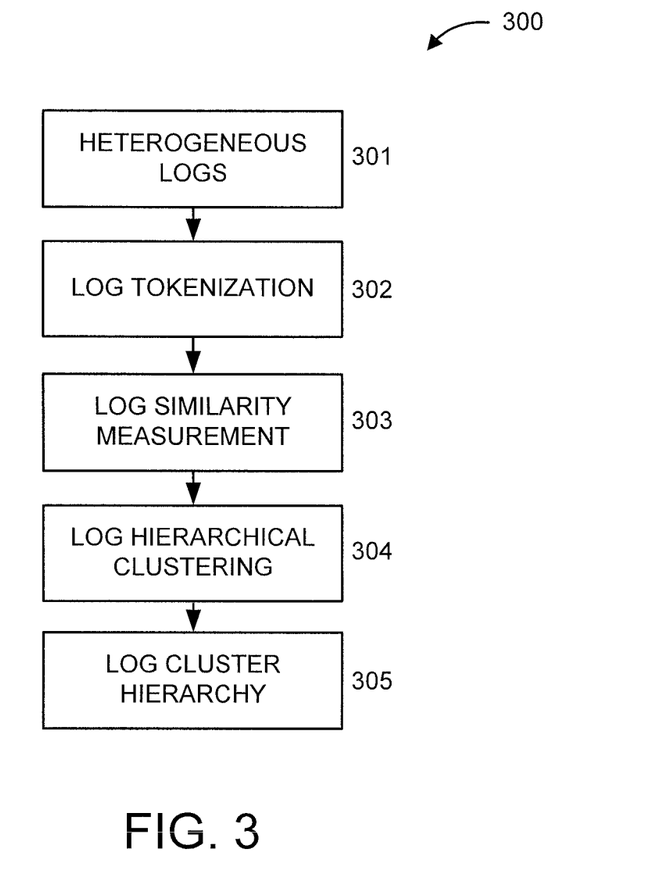
FIG. 3 is a flow diagram showing an exemplary method 300 for heterogeneous log clustering, in accordance with an embodiment of the present principles.

FIG. 3 shows an exemplary method 300 for heterogeneous log clustering, in accordance with an embodiment of the present principles. Method 300 corresponds to the hierarchical log clusterer 211 of FIG. 2. Note that following step 301 represents providing the input (heterogeneous logs) 201 of system 200 as an input to method 300.

Taking arbitrary heterogeneous logs 201 (step 301), a tokenization is processed (step 302) so as to generate semantically meaningful tokens from logs. Step 302 uses a tokenizer which will to a large extent not interfere with any predefined tokens in the heterogeneous logs, even though the predefined tokens are unknown. In addition, the component performs preprocessing so as to capture the meaning of the tokens in step 302. After the heterogeneous logs are tokenized, a similarity measurement on heterogeneous logs is applied (step 303). This similarity measurement leverages both the log layout information and log content information, and it is specially tailored to arbitrary heterogeneous logs. Once the similarities among logs are captured, a log hierarchical clustering algorithm can be applied (step 304) so as to generate and output a log cluster hierarchy (step 305). The system 200 provides a flexible framework for users to plug in their favorite hierarchical clustering algorithms.

Figure 4:
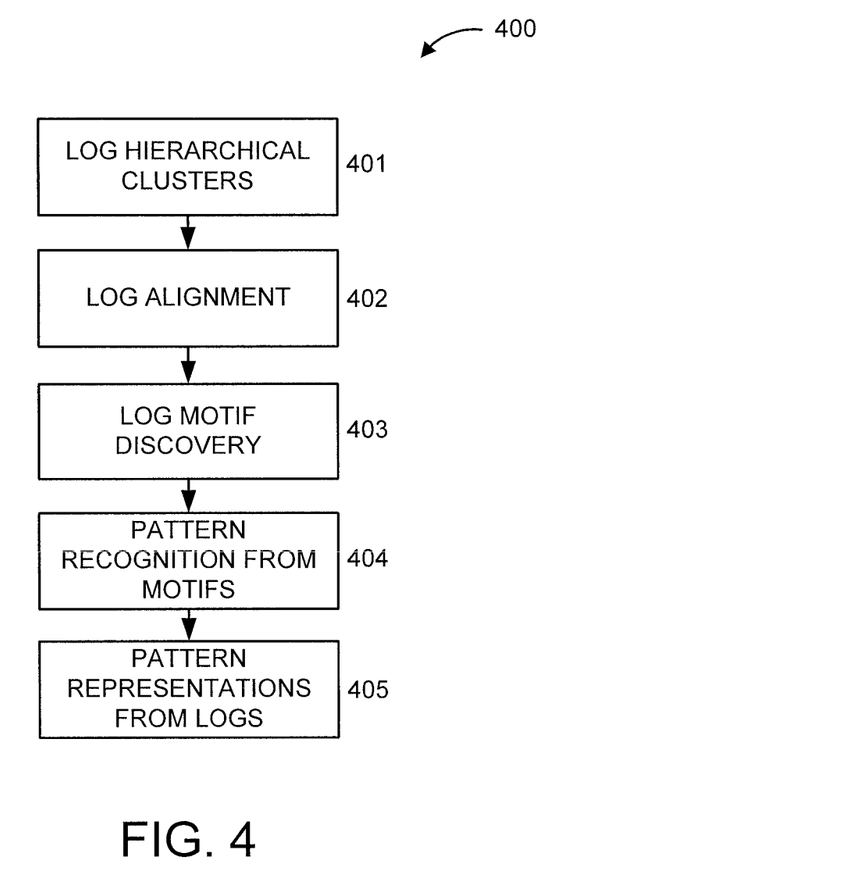
FIG. 4 is a flow diagram showing an exemplary method 400 for log pattern recognition, in accordance with an embodiment of the present principles.

FIG. 4 shows an exemplary method 400 for log pattern recognition, in accordance with an embodiment of the present principles. Method 400 corresponds to the log pattern recognizer 212 of FIG. 2. Note that following step 401 represents providing the output of hierarchical log clusterer 211/method 300 as an input to method 400.

Once the log cluster hierarchies are received (step 401), within each cluster that on the lowest level in the log cluster hierarchy, the logs are aligned (step 402). The log alignment is designed to preserve the unknown layouts of heterogeneous logs so as to help log pattern recognition in the following steps. Once the logs are aligned, log motif discovery (step 303) is conducted so as to find the most representative layouts and log fields. The following step is pattern recognition from such motifs (step 404). In step 403, fields such as time stamps, Internet Protocol (IP) addresses and universal resource locators (URLs) are recognized. In addition, other fields which are highly conserved in the logs are recognized and organized in a data structure in the cluster hierarchy. Note that the above log motif discovery and pattern recognition are first done in the lowest level of the log hierarchy. After that, all the information is back propagated up to higher levels in the hierarchy, and fused with their local patterns to provide pattern representations from the logs (step 405).

Figure 5:
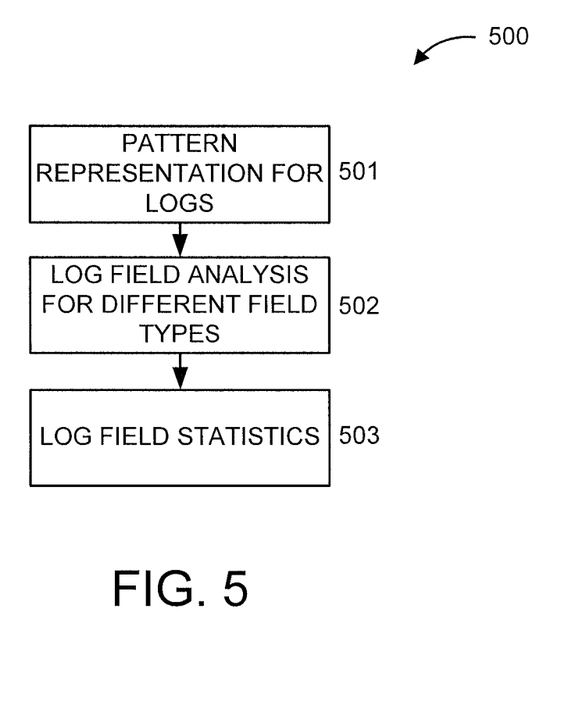
FIG. 5 is a flow diagram showing an exemplary method 500 for log field analysis, in accordance with an embodiment of the present principles.

FIG. 5 shows an exemplary method 500 for log field analysis, in accordance with an embodiment of the present principles. Method 500 corresponds to the log field analyzer 213 of FIG. 2. Note that following step 501 represents providing the output of log pattern recognizer 212/method 400 as an input to method 500.

Taking the pattern representations for the logs (501), each log field is analyzed based on their type as indicated in their pattern representation (step 502). Different methods are applied for different fields including IP addresses, time stamps, and numerical values. After this field analysis, the statistics will be output (Step 503). Each log cluster can then keep the statistics for each log field.

Figure 6:
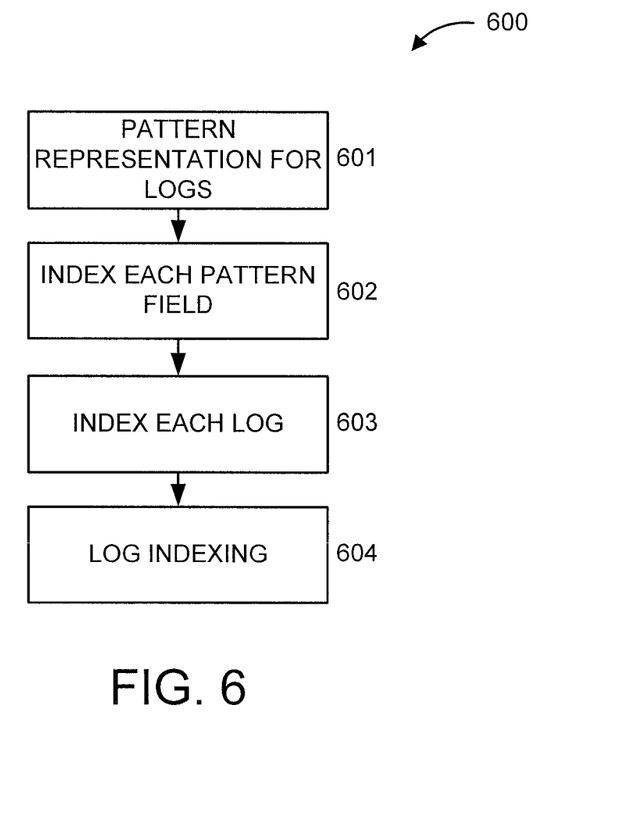
FIG. 6 is a flow diagram showing an exemplary method 600 for log indexing, in accordance with an embodiment of the present principles.

FIG. 6 shows an exemplary method 600 for log indexing, in accordance with an embodiment of the present principles. Method 600 corresponds to the log indexer 214 of FIG. 2. Note that following step 601 represents providing the output of log pattern recognizer 213/method 500 as an input to method 600.

Pattern representations for the logs are provided (step 601. Each pattern is analyzed and each field of the patterns is indexed (step 602) in a data structure in the hierarchy. Meanwhile, each original log is indexed as to which field the log has and its position in the hierarchy (step 603). A log indexing structure in the hierarchy is output (step 604) which enables query.

Figure 7:
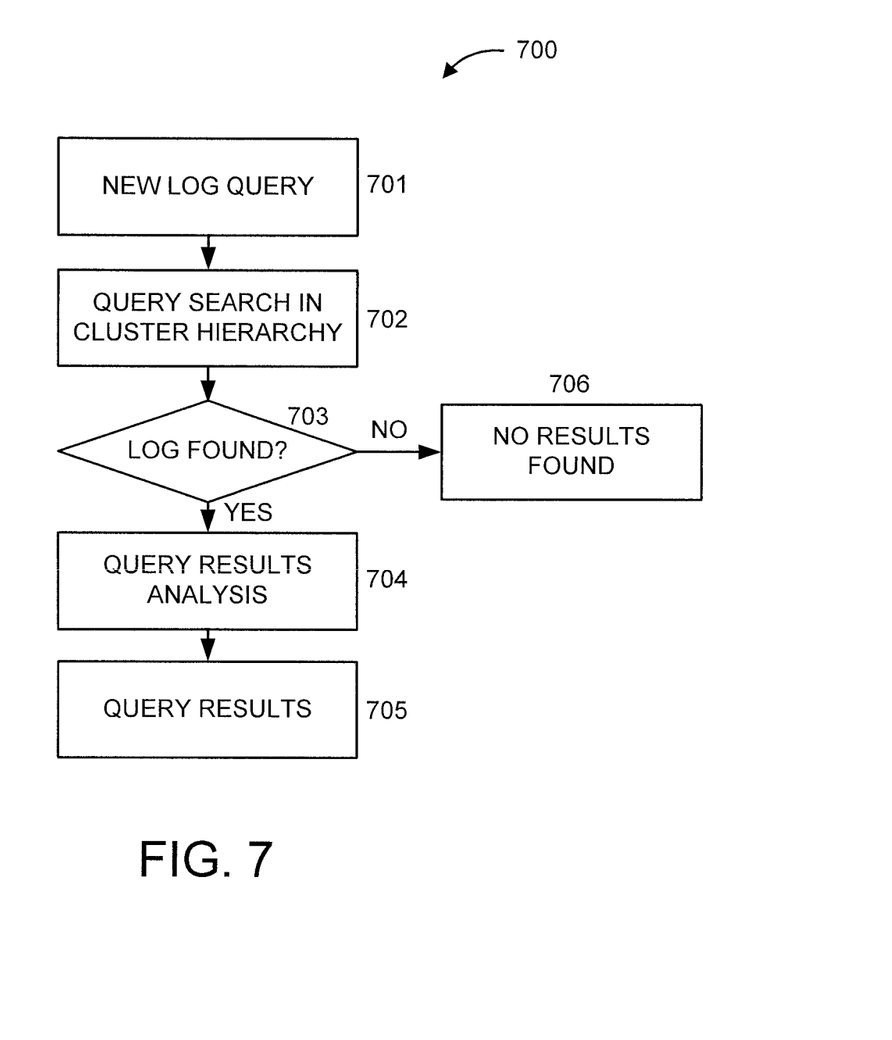
FIG. 7 is a flow diagram showing an exemplary method 700 for log querying, in accordance with an embodiment of the present principles.

FIG. 7 shows an exemplary method 700 for log querying, in accordance with an embodiment of the present principles. The method 700 demonstrates how the system 200 supports queries.

Given a log query (step 701), the system 200 searches the hierarchy based on indices and the results from field analysis (step 702). At step 703 it is determined if a hit (log) or multiple hits (logs) are found. If so, then the system 200 conducts an analysis on the query results on different fields (step 704) and reports such analysis together with the query results (step 705). Otherwise, no results found is reported (step 706).

A brief description will now be provided of some of the many attendant novelties of the present principles.

The log cluster generation method is new. In the prior art, there has not been a clustering method which is able to simultaneously capture log format characteristics for heterogeneous logs and meanwhile detect anomalous logs. In our approach, the inherent log format characteristics, as well as log context, is encoded in the pairwise log similarity measures, and thus automatically logs with similar formats are put into a same cluster in the first step. This facilitates the in-detail format recognition within a same cluster. In addition, this depicts the overall structure of all the log data, which corresponds to the system component structure, and thus an overview of the system.

The log format recognition is very different from the prior art. In this step, common (i.e., system-independent) fields such as timestamps, IP addresses, URLs are first recognized. The remaining system-dependent fields are recognized via sequence alignment techniques so as to find the common patterns that are conserved among the logs. This makes the log format recognition fully data-oriented and domain-knowledge-free. Moreover, no deep semantic analysis on the logs is required.

The log organization method and structure is new. In the prior art, heterogeneous log organization and indexing has not been tackled, and thus no effective organization method has been proposed. The approach of the present principles demonstrates the hierarchical structure which not only indexes heterogeneous logs based on global log data density, but also encodes the log formats, keyword distributions and other useful information in a hierarchical fashion. The tree structure itself provides a global overview and interpretation of the log data under consideration.

The heterogeneous log query based on the hierarchical structure is new. In the prior art, no system has been proposed to handle log queries when the logs are heterogeneous, from arbitrary/unknown applications and without domain knowledge. The present principles provide a way such that without writing a parser for each log format, the query can still be performed by format comparison. The unique advantage of this is that it is highly generalizable to new formats and prevents developers from customizing a new parser for a new log format.

A description will now be given of some of the many attendant competitive/competitive values of the present principles.

The present principles involve the first approach that performs heterogeneous log analysis in an automatic, principled and domain-knowledge-free fashion. The present principles do not require specific domain knowledge about the underlying system in order to analyze log data. The present principles are built up purely from log data and automatically customized to the log data and its system, and thus are highly general and applicable to arbitrary systems with even unknown application components.

The present principles provide an efficient and unique platform for system log data organization, indexing, information retrieval and anomaly detection based on heterogeneous logs. The present principles multiple functionalities and generalizability distinguish from all the existing log analysis tools.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for heterogeneous log analysis, comprising:
    performing hierarchical log clustering on heterogeneous logs to generate a log cluster hierarchy for the heterogeneous logs by pruning search space for efficient querying, the pruning reducing processing time and memory requirements for the querying, the log cluster hierarchy including log clusters conforming to heterogenous and unknown log formats, the unknown log formats being domain-knowledge-free, and including logs from arbitrary and unknown applications;
    performing, by a log pattern recognizer device having a processor, log pattern recognition on the log cluster hierarchy to generate log pattern representations, the log pattern recognition determining optimal representative layouts and log fields by executing context-free motif discovery within the log clusters;
    generating log field statistics by automatically performing domain-knowledge-free log field analysis on the log pattern representations;
    performing log indexing on the log pattern representations to generate searchable log indexes; and
    searching the log cluster hierarchy based on the log indexes and the log field statistics responsive to a log query to generate log query results.

2. The method of claim 1, further comprising performing an analysis on the log query results to provide analytical results on the log query results.

3. The method of claim 1, wherein the step of performing hierarchical log clustering comprises:
    performing log tokenization on the heterogeneous logs to generate semantic tokens therefrom; and
    applying a log similarity measurement on the heterogeneous logs that leverages log layout information and log content information, at least some of which is derived from the semantic tokens, to generate log similarities amongst the heterogeneous logs.

4. The method of claim 3, wherein the log similarities comprise respective pairwise log similarity measures that respective encode at least some of the log layout information and the log content information for respective pairs of the heterogeneous logs.

5. The method of claim 1, wherein the step of performing log pattern recognition comprises:
    performing log alignment on the heterogeneous logs located in each of a plurality of clusters of the log cluster hierarchy;
    performing log motif discovery on the aligned heterogeneous logs to identify one or more log motifs responsive to log layouts and log fields;
    performing pattern recognition on the aligned heterogeneous logs responsive to the one or more log motifs.

6. The method of claim 5, further comprising back-propagating information determined from the log pattern recognition step into respective levels of the log cluster hierarchy.

7. The method of claim 1, wherein the step of performing log pattern recognition further comprises organizing the log fields in a data structure comprised in the log cluster hierarchy.

8. The method of claim 1, wherein the step of performing log indexing on the log pattern representations generates the log indexes responsive to respective formats and locations of the heterogeneous logs in the log cluster hierarchy.

9. The method of claim 1, wherein the step of performing log indexing on the log pattern representations comprises:
    performing pattern field indexing on the log pattern representations to generate pattern field indexing results; and
    performing log indexing on the heterogeneous logs responsive to fields in the heterogeneous logs and respective positions of the fields in the log cluster hierarchy to generate log indexing results.

10. The method of claim 9, wherein the step of performing log indexing on the heterogeneous logs comprises generating a searchable indexing structure in the log cluster hierarchy responsive to the pattern field indexing results and the log indexing results.

11. The method of claim 1, wherein the heterogeneous logs comprise a plurality of logs at least some of which having different formats, different purposes, and different content with respect to each other.

12. The method of claim 1, wherein the log indexes are generated responsive to global log data density.

13. A non-transitory article of manufacture tangibly embodying a computer readable program which when executed causes a computer to perform the steps of claim 1.

14. A system for heterogeneous log analysis, comprising:
a hierarchical log clusterer for performing hierarchical log clustering on heterogeneous logs to generate a log cluster hierarchy for the heterogeneous logs by pruning search space for efficient querying, the pruning reducing processing time and memory requirements for the querying, the log cluster hierarchy including log clusters conforming to heterogenous and unknown log formats, the unknown log formats being domain-knowledge-free, and including logs from arbitrary and unknown applications;
a log pattern recognizer device having a processor for performing log pattern recognition on the log cluster hierarchy to generate log pattern representations, the log pattern recognition determining optimal representative layouts and log fields by executing context-free motif discovery within the log clusters;
a log field analyzer for generating log field statistics by automatically performing domain-knowledge-free log field analysis on the log pattern representations;
a log indexer for performing log indexing on the log pattern representations to generate searchable log indexes; and
a heterogeneous log analyzer for searching the log cluster hierarchy based on the log indexes and the log field statistics responsive to a log query to generate log query results.

15. The system of claim 14, wherein the heterogeneous log analyzer performs an analysis on the log query results to provide analytical results on the log query results.

16. The system of claim 14, wherein the hierarchical log clusterer generates the log cluster hierarchy by performing log tokenization on the heterogeneous logs to generate semantic tokens therefrom, and applying a log similarity measurement on the heterogeneous logs that leverages log layout information and log content information, at least some of which is derived from the semantic tokens, to generate log similarities amongst the heterogeneous logs.

17. The system of claim 16, wherein the log similarities comprise respective pairwise log similarity measures that respective encode at least some of the log layout information and the log content information for respective pairs of the heterogeneous logs.

18. The system of claim 14, wherein the log indexes are generated responsive to respective formats and locations of the heterogeneous logs in the log cluster hierarchy.

* * * * *